United States Patent
Benton

[11] Patent Number: 5,927,435
[45] Date of Patent: Jul. 27, 1999

[54] OBSERVATION AND HUNTING STAND WITH SAFETY PLATFORM

[76] Inventor: Gerald L Benton, 98 Smith St., Monticello, Ga. 31064

[21] Appl. No.: 08/839,960

[22] Filed: Apr. 24, 1997

[51] Int. Cl.⁶ .................................................. A01M 31/02
[52] U.S. Cl. ........................................... 182/116; 182/129
[58] Field of Search ..................................... 182/116, 129, 182/115; 139/901

[56] References Cited

U.S. PATENT DOCUMENTS

| | | | |
|---|---|---|---|
| 3,220,766 | 11/1965 | Kates | 182/116 |
| 3,967,694 | 7/1976 | Woolfolk | 135/901 |
| 4,410,066 | 10/1983 | Swett | 182/187 |
| 4,674,598 | 6/1987 | Sides | 182/116 |
| 4,699,248 | 10/1987 | Roy | 182/116 |
| 5,409,081 | 4/1995 | Reeves | 182/116 |

*Primary Examiner*—Alvin Chin-Shue

[57] ABSTRACT

A new observation and hunting stand with safety platform for preventing accidental falls from such stands, particularly tripod supported stands. The inventive device includes a tripod support base supported by the ground, and a platform attached to an upper end of the tripod support base. The platform includes a pivoting door formed therein which pivots between open and closed positions to permit ingress into, and egress from, the platform. In the closed position of the door, the platform is substantially solid with no openings therein, to prevent falls from the platform. The door is trapezoidal in shape with a wide end thereof adjacent the edge of the platform to allow passage of a person. In the open position of the door, the door rests against a seat support post, thus defining a stop for the door.

7 Claims, 2 Drawing Sheets

OBSERVATION AND HUNTING STAND WITH SAFETY PLATFORM

BACKGROUND OF THE INVENTION

1. Field of the Invention

The present invention relates to hunting and observation stands and more particularly pertains to a new observation and hunting stand with safety platform for preventing accidental falls from such stands, particularly tripod supported stands.

2. Description of the Prior Art

The use of hunting and observation stands is known in the prior art. More specifically, hunting and observation stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art hunting and observation stands include U.S. Pat. No. 5,327,993; U.S. Pat. No. 5,009,283; U.S. Pat. No. 4,699,248; U.S. Pat. No. 5,195,611; U.S. Pat. No. 5,282,520; and U.S. Pat. No. 4,257,490.

While these devices fulfill their respective, particular objectives and requirements, the aforementioned patents do not disclose a new observation and hunting stand with safety platform. The inventive device includes a tripod support base supported by the ground, and a platform attached to an upper end of the tripod support base. The platform includes a pivoting door formed therein which pivots between open and closed positions to permit ingress to, and egress from, the platform. In the closed position of the door, the platform is substantially solid with no openings therein, to prevent falls from the platform. The door is trapezoidal in shape with a wide end thereof adjacent the edge of the platform to allow passage of a person. In the open position of the door, the door rests against a seat support post, thus defining a stop for the door.

In these respects, the observation and hunting stand with safety platform according to the present invention substantially departs from the conventional concepts and designs of the prior art, and in so doing provides an apparatus primarily developed for the purpose of preventing accidental falls from such stands, particularly tripod supported stands.

SUMMARY OF THE INVENTION

In view of the foregoing disadvantages inherent in the known types of hunting and observation stands now present in the prior art, the present invention provides a new observation and hunting stand with safety platform construction wherein the same can be utilized for preventing accidental falls from such stands, particularly tripod supported stands.

The general purpose of the present invention, which will be described subsequently in greater detail, is to provide a new observation and hunting stand with safety platform apparatus which has many of the advantages of the hunting and observation stands mentioned heretofore and many novel features that result in a new observation and hunting stand with safety platform which is not anticipated, rendered obvious, suggested, or even implied by any of the prior art hunting and observation stands, either alone or in any combination thereof.

To attain this, the present invention generally comprises a tripod support base supported by the ground, and a platform attached to an upper end of the tripod support base. The platform includes a pivoting door formed therein which pivots between open and closed positions to permit ingress into, and egress from, the platform. In the closed position of the door, the platform is substantially solid with no openings therein, to prevent falls from the platform. The door is trapezoidal in shape with a wide end thereof adjacent the edge of the platform to allow passage of a person. In the open position of the door, the door rests against a seat support post, thus defining a stop for the door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new observation and hunting stand with safety platform apparatus which has many of the advantages of the hunting and observation stands mentioned heretofore and many novel features that result in a new observation and hunting stand with safety platform which is not anticipated, rendered obvious, suggested, or even implied by any of the prior art hunting and observation stands, either alone or in any combination thereof.

It is another object of the present invention to provide a new observation and hunting stand with safety platform which may be easily and efficiently manufactured and marketed.

It is a further object of the present invention to provide a new observation and hunting stand with safety platform which is of a durable and reliable construction.

An even further object of the present invention is to provide a new observation and hunting stand with safety platform which is susceptible of a low cost of manufacture with regard to both materials and labor, and which accordingly is then susceptible of low prices of sale to the consuming public, thereby making such observation and hunting stand with safety platform economically available to the buying public.

Still yet another object of the present invention is to provide a new observation and hunting stand with safety platform which provides in the apparatuses and methods of the prior art some of the advantages thereof, while simultaneously overcoming some of the disadvantages normally associated therewith.

Still another object of the present invention is to provide a new observation and hunting stand with safety platform for preventing accidental falls from such stands, particularly tripod supported stands.

Yet another object of the present invention is to provide a new observation and hunting stand with safety platform which includes a tripod support base supported by the ground, and a platform attached to an upper end of the tripod support base. The platform includes a pivoting door formed therein which pivots between open and closed positions to permit ingress into, and egress from, the platform. In the closed position of the door, the platform is substantially solid with no openings therein, to prevent falls from the platform. The door is trapezoidal in shape with a wide end thereof adjacent the edge of the platform to allow passage of a person. In the open position of the door, the door rests against a seat support post, thus defining a stop for the door.

Still yet another object of the present invention is to provide a new observation and hunting stand with safety platform that prevents falls from the stand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
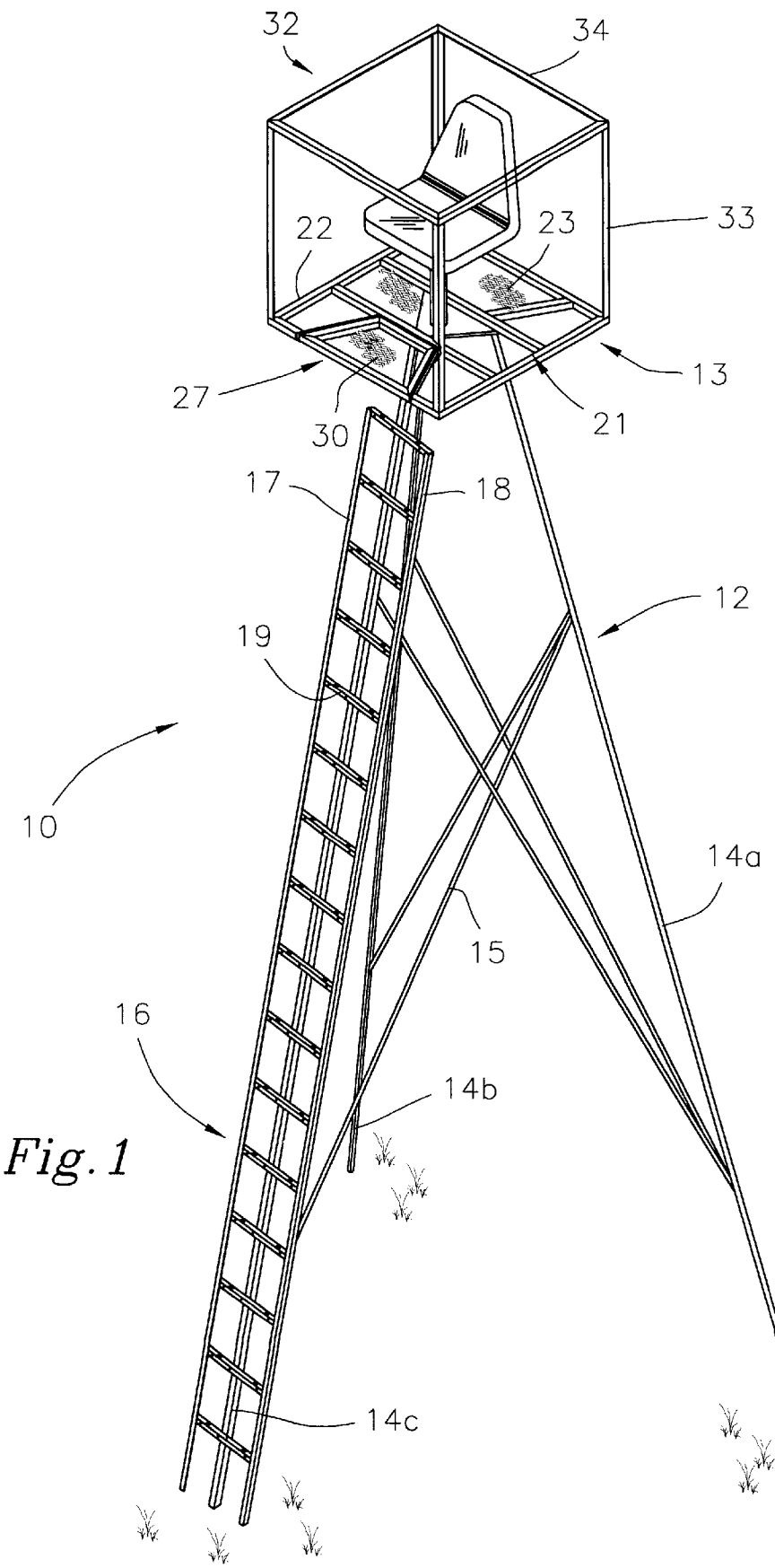
FIG. 1 is a elevated side perspective view of a new observation and hunting stand with safety platform according to the present invention.
Figure 2:
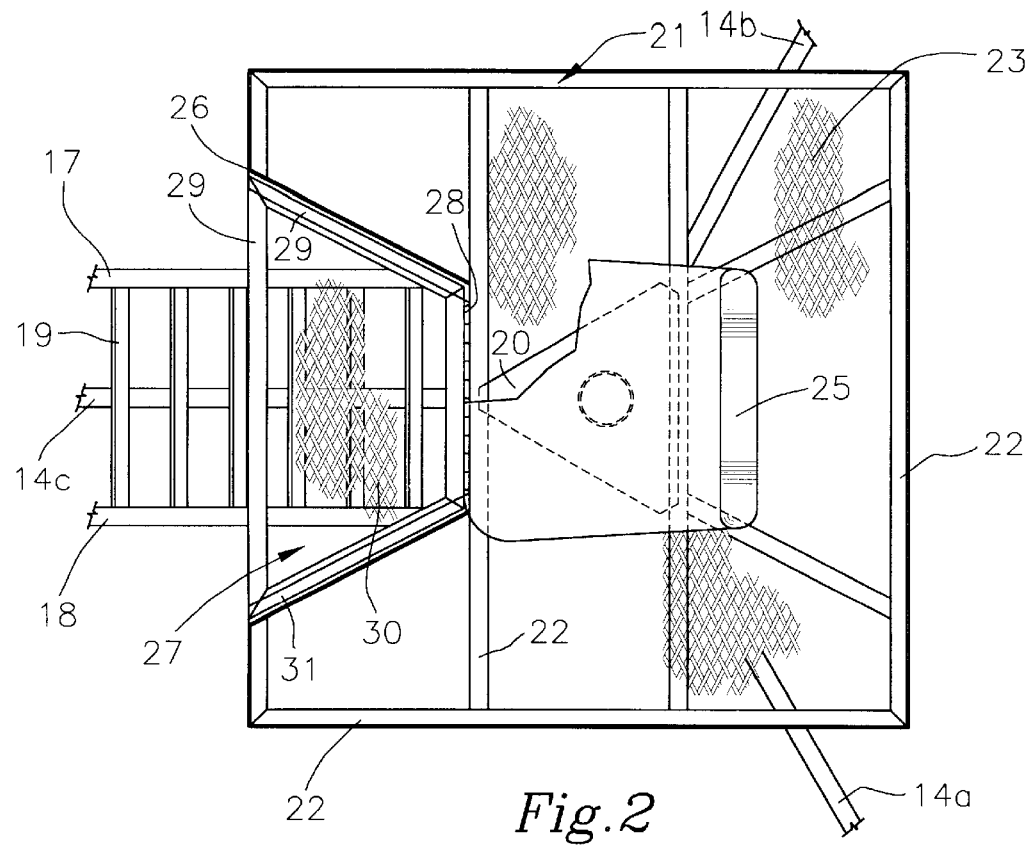
FIG. 2 is a top view of the present invention.
Figure 3:
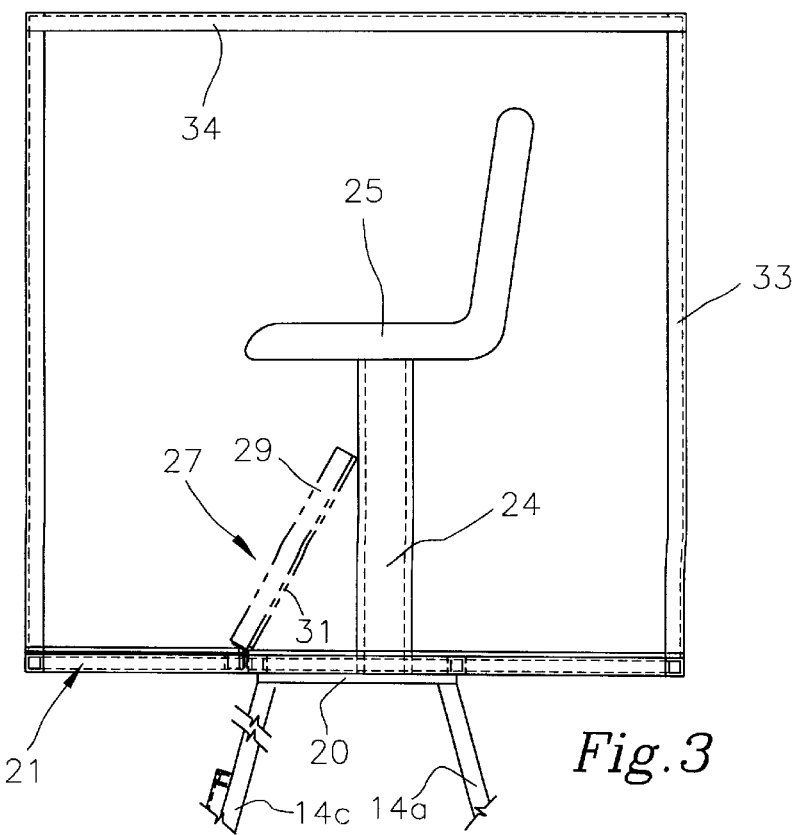
FIG. 3 is a side view of the upper portion of the stand.

With reference now to the drawings, and in particular to FIGS. 1 through 3 thereof, a new observation and hunting stand with safety platform embodying the principles and concepts of the present invention and generally designated by the reference numeral 10 will be described.

As best illustrated in FIGS. 1 through 3, the observation and hunting stand with safety platform 10 comprises a tripod support base 12 and a platform assembly 13 secured to the top of the tripod support base 12.

The tripod support base 12 comprises three support legs 14a,b,c of lightweight square tubing or the like, arranged in a triangular fashion, as in a tripod. The legs 14a–c are braced by a series of braces 15 which extend between the legs 14a–c. A ladder assembly 16 is connected to the support leg 14c so as to extend from the base thereof to adjacent the top end thereof. The ladder assembly 16 includes a pair of parallel side rails 17,18 made of lightweight square tubing or the like, with a series of horizontal, vertically spaced rungs 19 extending between the side rails 17,18. The side rails 17,18 are preferably supported on the ground and extend on either side of the leg 14c, while the rungs 19 are securely attached in any appropriate manner at each end to the side rails and at the middle to the leg 14c. The braces 15 and rungs 19 are preferably made from lightweight metallic angle members, although other shapes and materials could be used if desired. The legs 14a,b,c are preferably made so that they can be broken down into smaller sections, thus making transport of the stand easier.

A triangular support plate 20 is attached to the top ends of the legs 14a–c in order to form a planar support surface for supporting the platform assembly 13 thereon. The assembly 13 includes a planar platform member 21 which is affixed in any appropriate manner to the plate 20. The platform member 21 is rectangular in shape, and includes a series of frame members 22 defining a platform member frame with a covering 23 of expanded metal connected to and extending between the frame members 22.

A seat support post 24 extends upwardly from the platform member 21 and rotationally supports a seat 25 thereon. The seat 25 is supported for 360 degree rotation, allowing the user to see in all directions while staying seated. A trapezoidal shaped entry passage 26 is formed through the edge of the platform member 21 generally vertically above the ladder assembly 16, and a trapezoidal shaped door 27 is attached to the platform member so as to selectively open and close the passage 26. The door 27 includes a smaller edge which is secured by a hinge 28 to one of the frame members 22 of the platform member 21, while the larger edge thereof forms a portion of the outer edge of the platform member. The door 27 is defined by a plurality of door frame members 29 with expanded metal 30 secured between the members 29. The door frame members 29 which define the angled sides of the trapezoidal door 27 each have a flange 31 formed thereon which engages with the structure of the platform 21 which defines the passage 26 when the door is closed, in order to stop the door at the closed position and prevent it from pivoting through the passage.

Thus, the door 27 is able to pivot between an open position, as shown in FIG. 3, to permit ingress to and egress from the platform, and a closed position, as shown in FIGS. 1–2, to close the passage 26 and thus prevent falls through the passage 26. In the open position, the door rests against the seat support post 24; thus the seat support post defines a stop for the door, and along with the flanges 31, determine the range of pivoting movement of the door. The door and passage are trapezoidal in shape, with the large side located at the edge of the platform, since the ladder assembly is situated such that when a person enters or leaves the platform, the widest portions of the body, like the shoulders, will be located adjacent the outer edge of the platform. Thus, the widest portion of the passage 26 is located at the edge of the platform.

In order to prevent accidental falls from the platform 21, a safety rail assembly 32 is secured to, and extends upward from, the platform. The safety rail assembly 32 comprises a vertical rail 33 extending upward from each corner of the platform, and horizontal rails 34 extending between the rails 33. The rails 33,34 are preferably lightweight angle or tubular members.

In use, if a person wishes to enter the stand, the person climbs the ladder assembly and pushes the door upward to the open position where it rests against the seat support post. The person enters through the passage 26 and climbs onto the platform. Once standing on the platform, or seated in the seat, the person then closes the door, which then forms a portion of the platform. Therefore, the person cannot fall through the passage 26 since it is closed by the door, thus increasing the safety of the stand. The person can safely stand on the door when it is closed due to the flanges 31.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An observation and hunting stand apparatus, comprising:

a tripod support base having a lower end supported by the ground and an upper end, said upper end forming a triangular support plate; and a platform having an outer perimeter and a pair of substantially parallel interior frame members, said platform being secured to the triangular support plate of the tripod support base such that one side of said triangular plate supports one of said pair of interior frame members and an apex opposite said one side of said triangular support plate supports another of said pair of interior frame members;

said platform including a trapezoidally-shaped pivoting door having a long side positioned opposite a short side, said door being formed in said platform, said door further being pivotable between open and closed positions, said door pivoting such that said short side is hingedly coupled to an interior portion of said platform, said door being adapted for receiving a body of a user therethrough such that a pair of shoulders of the user are received through said door proximate said long side for facilitating entry of the user through said door.

2. The observation and hunting stand apparatus according to claim 1, further comprising a seat support post attached to the platform and extending upwardly therefrom, and a seat attached to the seat support post, said long side of said pivoting door resting against said seat support post when in said open position.

3. The observation and hunting stand apparatus according to claim 1, wherein said door pivots upwardly relative to the platform and away from the tripod support base while pivoting from the closed position to the open position.

4. The observation and hunting stand apparatus according to claim 1, further comprising a ladder assembly connected to the tripod support base.

5. The observation and hunting stand apparatus according to claim 1, further comprising a safety rail assembly connected to, and extending upward from, the platform.

6. The observation and hunting stand apparatus according to claim 4 wherein said tripod support base includes three legs; and wherein said ladder includes a pair of laterally spaced side members and a plurality of rungs extending between said side members, a medial portion of each of said rungs being mounted to a front leg of said tripod support base such that said side members provide hand holds separate from said rungs and said front leg.

7. An observation and hunting stand apparatus comprising:

a tripod support base having a lower end supported by the ground and an upper end, said upper end forming a triangular support plate; and a platform having an outer perimeter and a pair of substantially parallel interior frame members, said platform being secured to the triangular support plate of the tripod such that one side of said triangular plate supports one of said pair of interior frame members and an apex opposite said one side of said triangular support plate supports another of said pair of interior frame members;

said platform including a trapezoidally-shaped pivoting door having a long side positioned opposite a short side, said door being formed in said platform, said door further being pivotable between open and closed positions, said door pivoting such that said short side is hingedly coupled to an interior portion of said platform and said long side generally aligns with an outer perimeter of said platform;

a seat support post attached to the platform and extending upwardly therefrom, and a seat attached to the seat support post, said long side of said pivoting door resting against said seat support post when said door is in said open position;

a ladder assembly connected to the tripod support base, said ladder assembly being positioned substantially below said door such that a pair of shoulders of a user climbing said ladder assembly are receivable through said door proximate said long side to faciliate entry of the user through said door; and a safety rail assembly connected to said platform and extending upwardly from said platform for preventing accidental falling from said platform.

\* \* \* \* \*